US006785550B1

(12) United States Patent
Bi et al.

(10) Patent No.: US 6,785,550 B1
(45) Date of Patent: *Aug. 31, 2004

(54) MOBILE LOCATION ESTIMATION IN A WIRELESS COMMUNICATION SYSTEM

(75) Inventors: Qi Bi, Morris Plains, NJ (US); Wen-Yi Kuo, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 750 days.

This patent is subject to a terminal disclaimer.

(21) Appl. No.: 09/724,238

(22) Filed: Nov. 28, 2000

Related U.S. Application Data

(63) Continuation of application No. 08/775,329, filed on Dec. 31, 2001, now Pat. No. 6,163,696.

(51) Int. Cl.$^7$ ................................................ H04Q 7/20
(52) U.S. Cl. ................. 455/456; 455/404.2; 455/456.2; 455/456.5; 342/457
(58) Field of Search ........................... 455/404.2, 422.1, 455/456.1, 456.2, 456.5, 456.6, 69; 342/450, 457

(56) References Cited

U.S. PATENT DOCUMENTS

| | | | | |
|---|---|---|---|---|
| 5,613,205 A | * | 3/1997 | Dufour | 455/440 |
| 5,764,188 A | * | 6/1998 | Ghosh et al. | 342/457 |
| 5,890,068 A | * | 3/1999 | Fattouche et al. | 455/456.2 |
| 5,943,014 A | * | 8/1999 | Gilhousen | 342/465 |
| 5,945,948 A | * | 8/1999 | Buford et al. | 342/457 |

OTHER PUBLICATIONS

M. Wylie et al., "the Non–Line of Sight Problem in Mobile Location Estimation," ICUPC '95, Boston, MA, 1995.
J. Caffery et al., "Radio Location in Urban CDMA Microcells," Proceedings of PIMRC '95, pp. 858–862, IEEE, 1995.

* cited by examiner

Primary Examiner—Simon Nguyen

(57) ABSTRACT

Methods and apparatus for estimating mobile station location in a wireless communication system. At initiation of a call or a page response, a mobile station of the system sends an access request signal to a primary base station. The primary base station responds with an access acknowledgment which may be intentionally delayed such that the mobile station increases its transmit power level. The primary base station then transmits a channel assignment message to the mobile station. The mobile station responds by transmitting a location signal in the form of a known user-specific traffic preamble at the higher transmit power level. The primary base station intentionally delays sending an acknowledgment of the preamble, such that the mobile station transmits the preamble for a longer period of time than it would otherwise. This additional transmission time allows the preamble to be detected accurately in the primary base station as well as in a number of other surrounding base stations in a manner suitable for generating path delay measurements. A primary location processor associated with the primary base station uses the path delay measurements from the primary and surrounding base stations to generate an estimate of mobile location. The mobile location estimation may be provided during an on-going call by the primary base station sending a fake handoff message to the mobile station directing it to handoff to the same base station and traffic channel but with a different power level and preamble length, or by the primary base station sending a predetermined location probe message directing the mobile station to transmit the traffic preamble with a desired power level and preamble length.

3 Claims, 7 Drawing Sheets

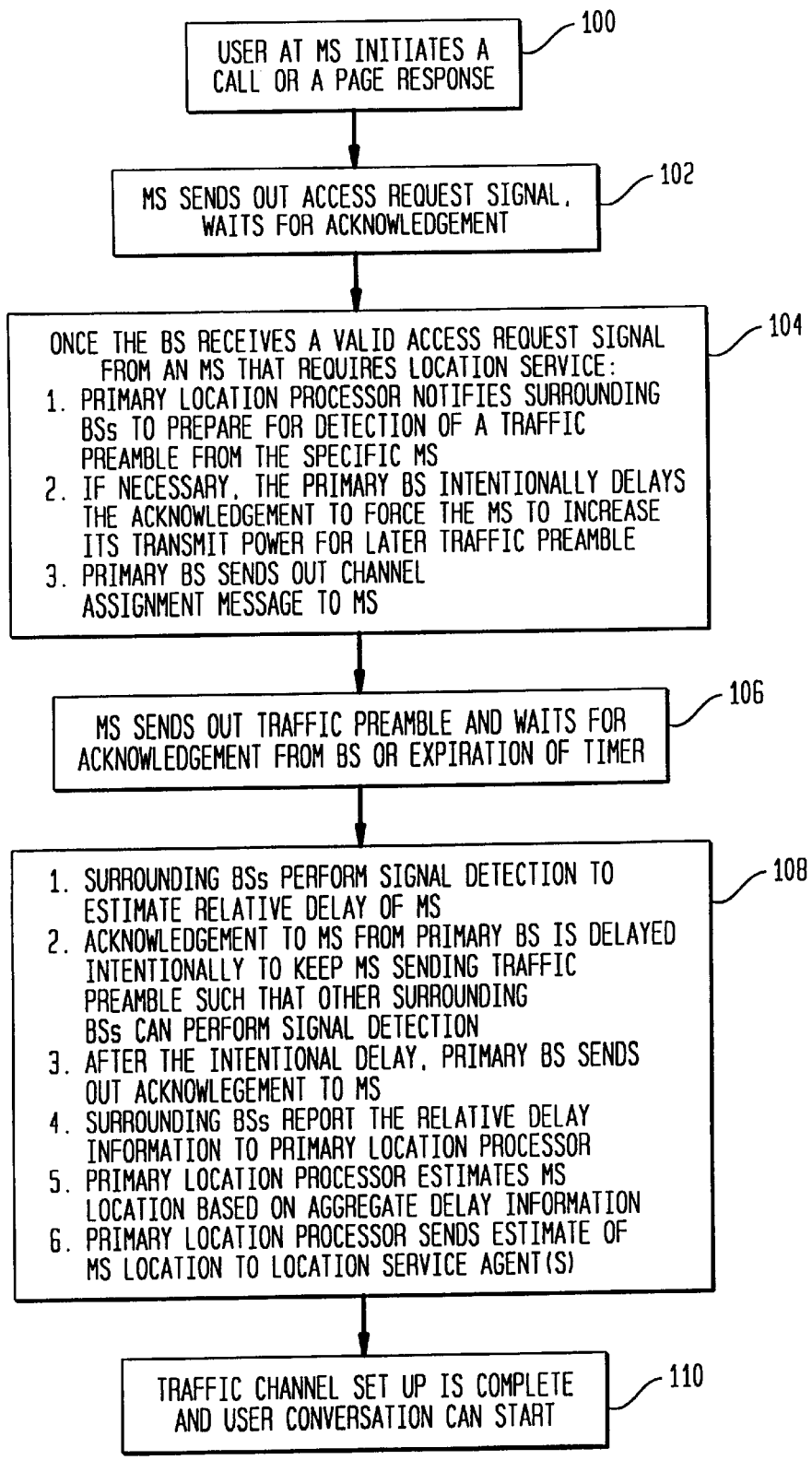

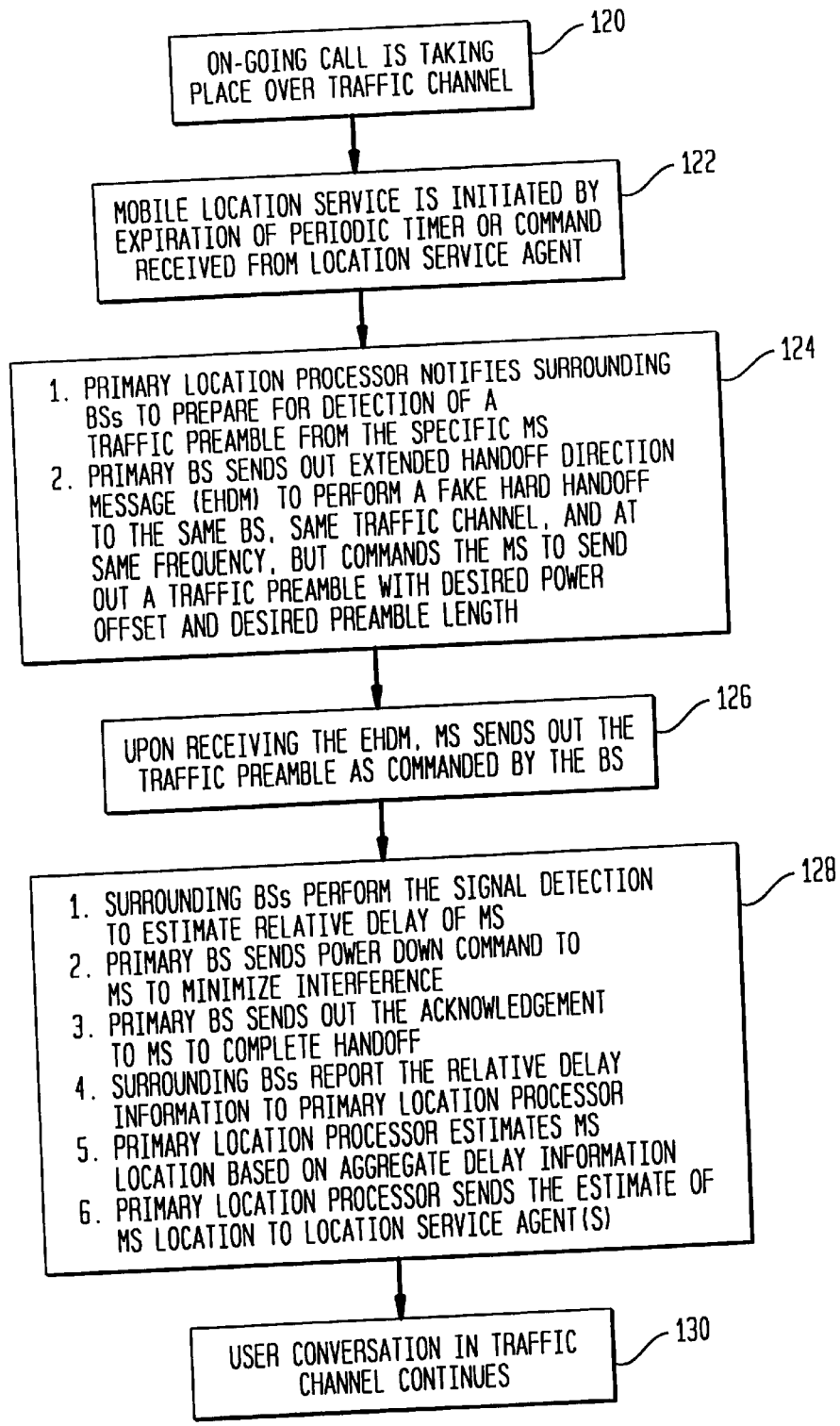

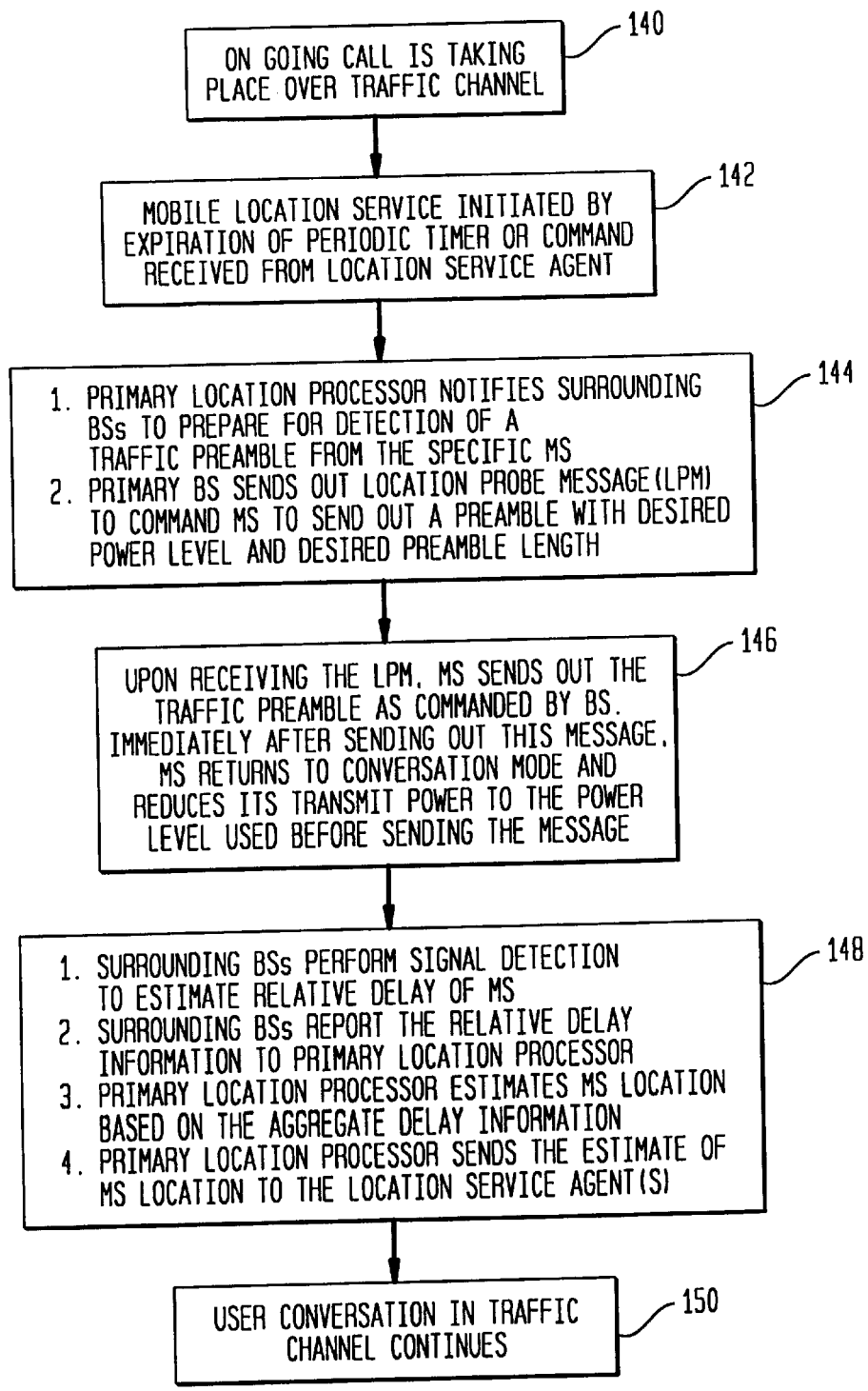

MOBILE LOCATION ESTIMATION IN A WIRELESS COMMUNICATION SYSTEM

"This application is a continuation of pending application Ser. No. 08/775,329, filed Dec. 31, 1996."

FIELD OF THE INVENTION

The present invention relates generally to wireless communication systems and more particularly to techniques for estimating mobile station location in a wireless code division multiple access (CDMA) system.

BACKGROUND OF THE INVENTION

Demand for wireless communication services, such as mobile telephones in cellular and Personal Communications Service (PCS) systems, is continually increasing. An important issue in wireless communication systems involves the estimation of mobile station location. For example, the Federal Communications Commission (FCC) has requested that all cellular and PCS systems eventually include emergency 911 caller location capabilities similar to those provided in wired systems. As reported in Radio Communications Report, Vol. 15, No. 51, Dec. 16, 1996, the FCC has required that Phase I of a wireless emergency 911 (E-911) system providing a 911 agent with caller number and cell site location must be completed by Apr. 1, 1998, while Phase II of the E-911 system providing caller latitude and longitude within a radius of no more than 125 meters in at least 67% of all cases must be completed by Oct. 1, 2001. A number of other services requiring mobile location estimation are also being considered, including routing guidance services, fleet management and local commercial services. A wireless system which is able to determine the position of a given mobile station in an efficient manner could thus provide an enhanced level of service to the user, while meeting the above-noted FCC requirements and also generating additional revenue for the service provider. It would also be very advantageous if mobile location estimation could be incorporated into a given system without the need for any significant change to the standards on which the system is based.

In order to estimate mobile location with an acceptable degree of accuracy, either the mobile station needs to be able to detect signals from at least three surrounding base stations, or at least three surrounding base stations need to be able to detect a signal from the mobile station. The resulting signal propagation delay information can then be processed in a conventional manner using triangular relationships to derive an estimate of mobile location. Two important aspects of mobile location estimation thus involve the manner in which the signals are detected in the mobile station or base stations, and the accuracy of the propagation delay measurements required between the mobile station and base stations. An exemplary prior art mobile estimation technique is described in M. Wylie et al., "The Non-Line of Sight Problem in Mobile Location Estimation," ICUPC '95, Boston, Mass. 1995, which is incorporated by reference herein.

In the case of a code division multiple access (CDMA) systems such as those based on the IS-95 standard, the implementation of a mobile location estimation capability presents a number of problems. Although CDMA systems spread signals over a wider frequency spectrum than narrowband systems such as TDMA, GSM and analog FM, and are therefore better able to resolve path delay ambiguity, the detection of signals from surrounding base stations by the mobile or detection of mobile signals by the surrounding base stations presents a greater challenge in CDMA systems than in narrowband systems. A basic principle of CDMA systems involves the use of power control to solve near-field problems and to control interference such that a capacity advantage can be achieved. Therefore, when the mobile station is not in a handoff zone, that is, when the mobile station is close to a base station, the signal strength from the surrounding base stations is very weak. Similarly, the power transmitted from the mobile is purposely made very small in order to prevent interference. This means that in order to achieve the capability of detecting signals from surrounding base stations in the mobile station or detecting a signal from the mobile station in surrounding base stations, an excessively large signal-to-noise gain may be required at the corresponding receivers. Application of conventional mobile location techniques to CDMA systems may therefore require alteration of basic system parameters, thereby increasing the cost and complexity of the system and possibly degrading system performance in terms of interference. An exemplary CDMA mobile estimation technique is described in J. Caffery et al., "Radio Location in Urban CDMA Microcells," Proceedings of PIMRC '95, pp. 858–862, IEEE, 1995, which is incorporated by reference herein. There are a number of problems with this prior art technique and other similar techniques. For example, such techniques typically utilize either coarse timing acquisition or a finer-acquisition delay lock loop to obtain path delay information. As noted above, it is difficult to detect a mobile station signal at the surrounding base stations unless an excessively large signal-to-noise gain is obtained, and the coarse timing and delay lock loop techniques have failed to solve this problem. In addition, the use of a delay lock loop usually requires the surrounding base stations to detect the mobile station signal either continuously or for a very long detection period, thereby wasting system resources and significantly increasing system complexity. Moreover, it is generally not feasible to utilize a delay lock loop in conjunction with an increased mobile station power level to assist acquisition because the resulting interference would substantially reduce system capacity.

As is apparent from the above, a need exists for an improved technique for estimating mobile station location in a wireless communication system, and which can be implemented in a CDMA system without requiring any significant alteration to system operating and performance standards.

SUMMARY OF THE INVENTION

The present invention provides methods and apparatus for determining mobile location in a wireless communication system. The invention allows a mobile station to transmit a location signal which can be detected and processed in a primary base station and a number of surrounding base stations in order to generate accurate path delay measurements. The primary base station controls characteristics of the location signal such as power level and transmission duration in order to facilitate detection by surrounding base stations while minimizing the interference created by the location signal within the system.

In accordance with one aspect of the present invention, a mobile location estimation technique suitable for use at initiation of a call or page response is provided. A mobile station transmits an access request signal and waits for an acknowledgment from a base station. A given base station receiving the access request signal is designated as a primary base station and has a primary location processor associated therewith. The primary location processor notifies a number of surrounding base stations, typically two other base stations, to prepare for detection of a location signal from the mobile station. The primary base station then transmits an access acknowledgment to the mobile station. The primary base station may intentionally delay the transmission of this access acknowledgment such that the mobile station increases its transmit power level. The primary base station then sends a channel assignment message to the mobile station. The mobile station responds to receipt of the channel assignment message by transmitting a location signal at the increased transmit power level. The location signal may be a traffic preamble corresponding to a known set of data spread by a pseudorandom noise (PN) sequence specific to the mobile station. The primary base station and surrounding base stations detect the traffic preamble and utilize it to generate path delay measurements indicative of the path delay between the mobile station and the base stations. The primary base station intentionally delays the transmission of an acknowledgment of the traffic preamble, such that the mobile station continues to transmit the preamble for a longer period of time than it would otherwise. This extended transmission time allows the base stations to utilize a longer integration period in the detection process, resulting in more accurate path delay measurements. The primary location processor associated with the primary base station receives the aggregate path delay information from the base stations involved in the position estimation, and uses the path delay information to estimate the location of the mobile station. After the base stations have detected the traffic preamble, the primary base station sends an acknowledgment to the mobile station indicating that the channel set up is complete, and the call or page response can then take place over the traffic channel.

In accordance with another aspect of the invention, mobile estimation techniques suitable for use in on-going calls are provided. The mobile estimation techniques may be triggered by a request for mobile location service being received in a primary base station which is processing an on-going call for a particular mobile station. The mobile location service request may be in the form of a signal generated at the expiration of a periodic timer, or a command received from a location service agent. A primary location processor associated with the primary base station then directs a number of surrounding base stations to prepare for detection of a location signal to be transmitted by the mobile station. The location signal may be in the form of a traffic preamble typically generated by the mobile station during set up of the traffic channel for a conventional call.

A first technique suitable for use during on-going calls involves the primary base station transmitting a fake handoff message to the mobile user directing the mobile user to handoff to the same base station and traffic channel, but at a different power level and with a different preamble length. This fake handoff message may be provided using, for example, the extended handoff direction message (EHDM) of an IS-95 CDMA system. Upon receiving the fake handoff message, the mobile station transmits the traffic preamble at the power level and preamble length specified in the message. The preamble is detected in the primary and surrounding base stations to generate the path delay information in the manner previously described. The primary base station then sends a power down command directing the mobile station to reduce its transmit power in order to limit system interference, followed by an acknowledgment of the traffic preamble to complete the fake handoff process. The delay information generated by the various base stations is supplied to the primary location processor associated with the primary base station, and used to estimate the mobile station location. The mobile station stops transmitting the traffic preamble after receipt of the acknowledgment from the primary base station, and the on-going call can then continue over the traffic channel.

A second technique suitable for use during on-going calls involves the primary base station transmitting a location probe message (LPM) to the mobile user directing the mobile user to transmit a traffic preamble or other predetermined location signal at a desired power level and preamble length. Upon receiving the LPM, the mobile station transmits the traffic preamble at the specified power level and preamble length. The mobile station then immediately returns to a conversation mode and reduces its transmit power level to a power level used before sending out the traffic preamble. As in the previously-described technique, the traffic preamble is detected in the primary and surrounding base stations to generate the path delay information. The delay information generated by the various base stations is supplied to the primary location processor associated with the primary base station, and used to estimate the mobile station location. The on-going call continues in the traffic channel after the mobile station completes its transmission of the traffic preamble.

These and other features and advantages of the present invention will become more apparent from the accompanying drawings and the following detailed description.

BRIEF DESCRIPTION OF THE DRAWINGS

FIG. 5 is flow diagram illustrating mobile location estimation at the origination of a call or a page response in accordance with a first exemplary embodiment of the invention.

FIGS. 6 and 7 are flow diagrams illustrating mobile location estimation during an ongoing call in accordance with second and third embodiments of the invention.

DETAILED DESCRIPTION OF THE INVENTION

The present invention will be illustrated below in conjunction with an exemplary IS-95 code division multiple access (CDMA) wireless communication system. It should be understood, however, that the invention is not limited to use with any particular type of communication system, but is instead more generally applicable to any wireless system in which it is desirable to provide cost-effective mobile location estimation within the existing system performance parameters. For example, although the techniques are illustrated with reference to the IS-95 CDMA cellular and personal communications service (PCS) systems, it will be apparent to those skilled in the art that the techniques are also applicable to other CDMA systems, as well as to other types of wideband and narrowband wireless systems. The term "primary base station" as used herein refers generally to a base station communicating directly with a given mobile station, such as the base station handling an on-going call for the mobile station. The terms "surrounding base stations" or "secondary base stations" are intended to include those base stations other than the primary base station which are in proximity to a given mobile station at a particular time and are used to generate the additional path delay measurements used to estimate mobile position. The term "location signal" refers to a signal having certain known characteristics, which is generated by a mobile station and detected by primary and secondary base stations to generate aggregate path delay information for estimating mobile position. A "traffic preamble" is one type of location signal which may be transmitted by a mobile station over a traffic channel when initiating a call, responding to a page or during an on-going call.

Figure 1:
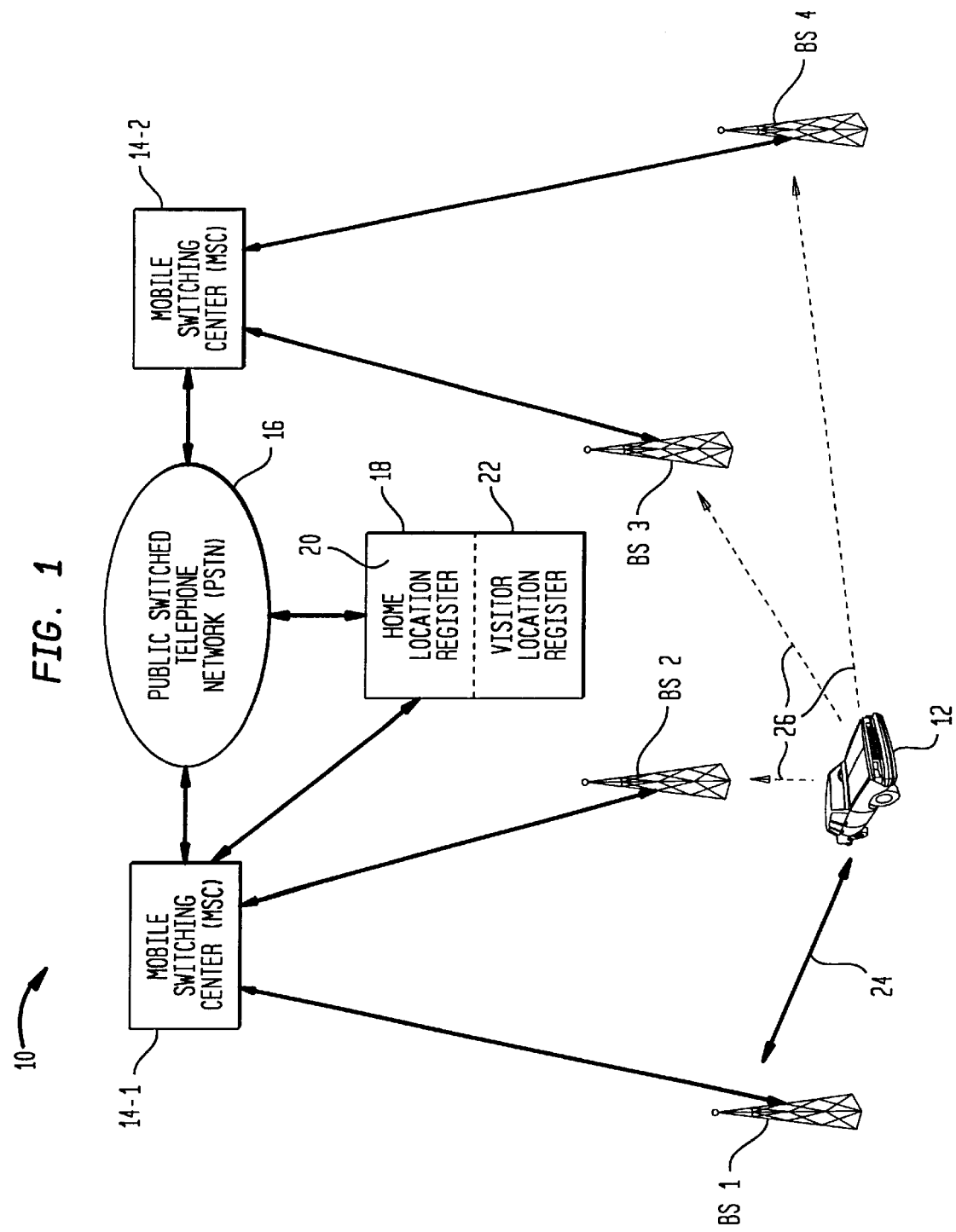
FIG. 1 shows an exemplary code division multiple access (CDMA) wireless communication system in which the mobile location techniques of the present invention may be implemented.

FIG. 1 shows an exemplary cellular or personal communication services (PCS) system 10. The system 10 is configured in accordance with TIA/EIA/IS-95A, "Mobile Station - Base Station Compatibility Standard for Dual-Mode Wideband Spread Spectrum Cellular System," June 1996, and ANSI J-STD-008, "Personal Station - Base Station Compatibility Requirements for 1.8 to 2.0 GHz Code Division Multiple Access (CDMA) Personal Communication Systems," both of which are incorporated by reference herein. The system 10 includes a mobile station (MS) 12 and a number of base stations BS1, BS2, BS3 and BS4. The base station BS1 of FIG. 1 represents a primary base station, communicating with mobile station 12 via the path designated by solid two-way arrow 24, while the surrounding base stations BS2, BS3 and BS4 may serve as secondary base stations which detect a location signal transmitted via the paths indicated by dashed one-way arrows 26. The primary base station BS1 communicates with the mobile station 12 using CDMA techniques described in the above-cited standards documents. As the mobile station 12 moves within the system 10, handoffs may occur such that base stations other than BS1 become primary base stations for communicating with the mobile station 12. The system 10 also includes first and second mobile switching centers (MSCs) 14-1 and 14-2. A given MSC typically connects several BSs with a public switched telephone network (PSTN) 16. In this exemplary embodiment, MSC 14-1 connects base stations BS1 and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

Figure 2A:
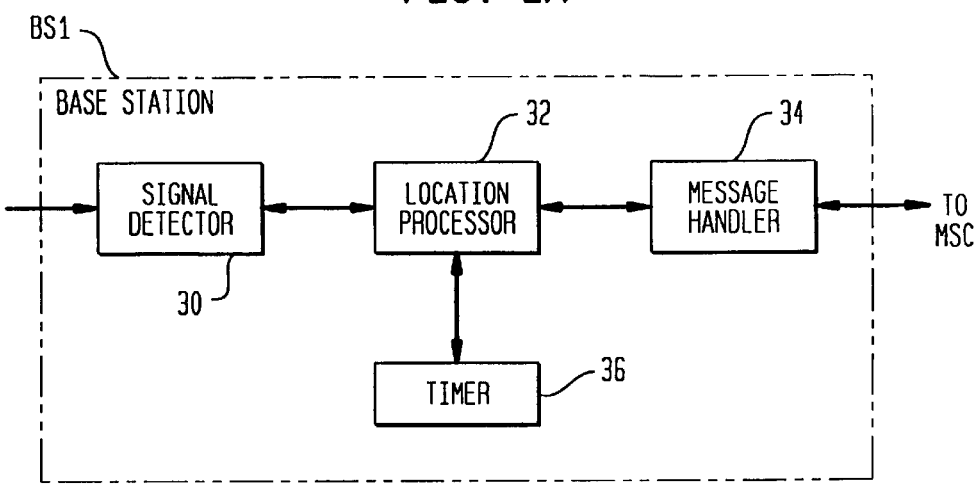
FIGS. 2A and 2B show exemplary implementations of mobile location estimation techniques of the present invention utilizing a base station and mobile switching center (MSC) of the wireless system of FIG. 1.
Figure 2B:
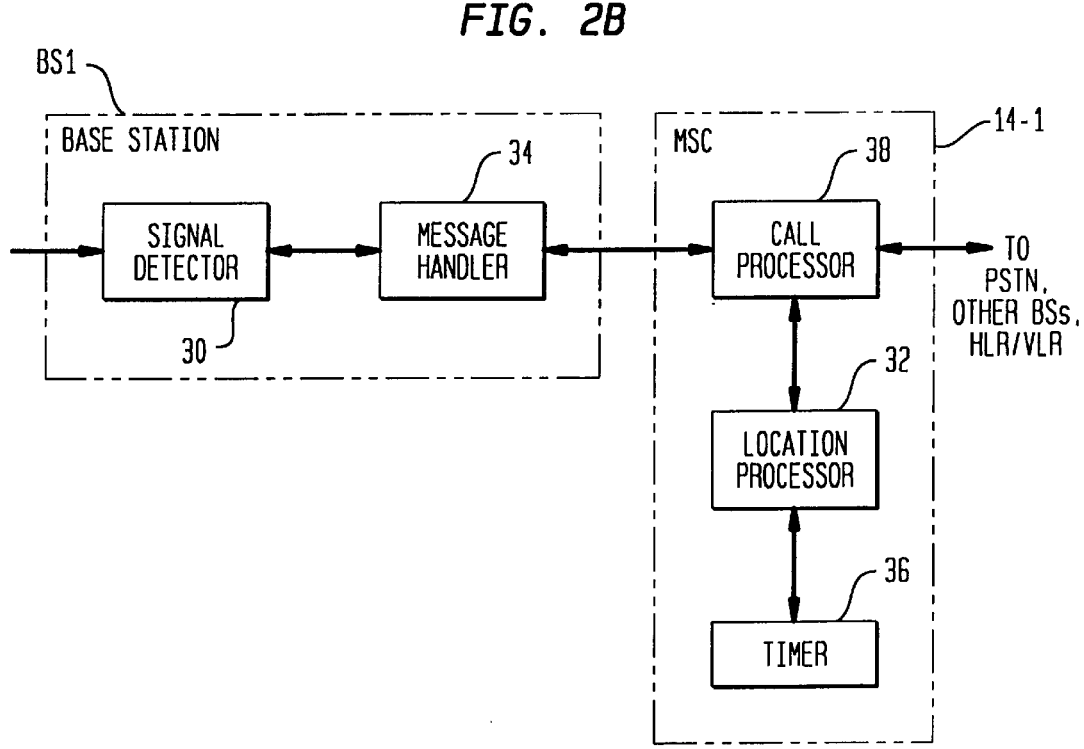

FIGS. 2A and 2B show two alternative implementations of a mobile location service in accordance with the invention, illustrated using the primary base station BS1 and MSC 14-1 of FIG. 1. In the FIG. 2A implementation, the base station BS1 includes a signal detector 30 for detecting a location signal transmitted by a particular mobile station 12 for which a location estimate is to be provided. As will be described in greater detail below, the location signal may be in the form of a traffic preamble generated by the mobile station 12 at initiation of a call, initiation of a page response or during an ongoing call in response to an appropriate message signal transmitted from primary base station BS1. The signal detector 30 provides signal power and path delay information regarding the detected signal to a location processor 32. The location processor 32 controls the timing and other operational parameters of signal detector 30. The location processor associated with the primary base station is designated as a primary location processor with the responsibility to estimate the mobile location based on the aggregate information received from location processors of at least two other surrounding secondary base stations. As noted above, the primary base station is generally the base station communicating directly with the mobile station 12. The base station BS1 in FIG. 2A further includes a message handler 34 which provides conventional call processing functions. The message handler 34 handles all messages communicated between the primary location processor and the location processors of the surrounding base stations. The base station BS1 communicates with its corresponding MSC 14-1 via the message handler 34 as shown. The base station BS1 also includes a timer 36 coupled to the location processor 32. The timer 36 serves to activate the mobile location service periodically if periodic probing of mobile location is requested. The periodic activation can be varied depending on the requirements of a particular application.

FIG. 2B shows an alternative implementation in which the location processor 32 is located in the MSC 14-1 rather than in the base station BS1 as in FIG. 2A. The base station BS1 in this embodiment includes the signal detector 30 and message handler 34 as previously described. The exemplary MSC 14-1 includes the location processor 32, the timer 36 and a call processor 38. The call processor 38 handles all messages communicated to or from the MSC including those relating to the location processor 32. The operation of the location processor 32 and timer 36 in both the FIG. 2A and FIG. 2B implementations will be described in greater detail below in conjunction with the flow diagrams of FIGS. 5, 6 and 7. It should be understood that although FIGS. 2A and 2B illustrate only a single base station, the other base stations in the system will also be configured in a similar manner.

Figure 3:
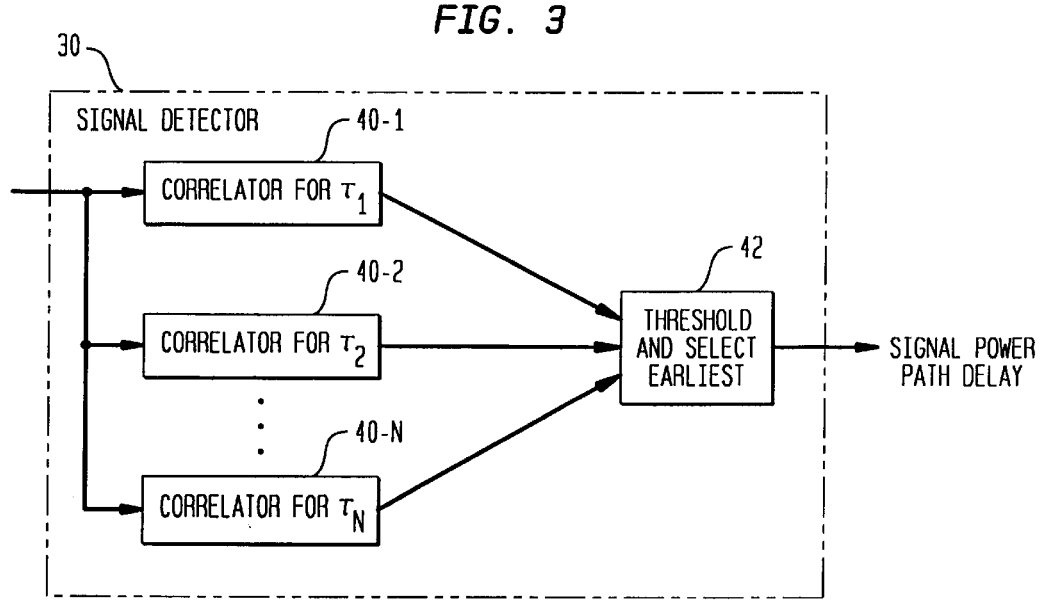
FIG. 3 is a block diagram of an exemplary signal detector suitable for use in the base station of FIGS. 2A and 2B.

FIG. 3 shows an exemplary signal detector 30 suitable for use within the base station BS1 of FIG. 2A or FIG. 2B to estimate the signal power and path delay of a signal received from the particular mobile station 12 to be located. The signal detector 30 includes a number of correlators 40-$i$, i=1, 2, 3, . . . N each of which receives the incoming location signal transmitted by the mobile station 12 and correlates the incoming signal with a different path delay hypothesis $\tau_i$. Determining the number of different path delay hypotheses to be used in a particular embodiment generally involves a trade off between hardware cost and processing delay, with more correlators increasing the hardware cost but decreasing the processing delay. For example, certain embodiments may reduce hardware costs by performing sequential detection using a relatively small number of correlators, with a corresponding increase in processing delay. An exemplary embodiment may utilize about 10 correlators to detect about 80 different path hypotheses using a timing resolution of about 406 nanoseconds. Of course, numerous other implementations having different arrangements of correlators, path hypotheses and timing resolutions may also be used. The detector 30 further includes a threshold and select circuit 42 which selects the output of the correlator 40-$i$ having the earliest arrival with a signal power greater than a detection threshold in order to determine the best path delay hypothesis. As previously noted, the signal power and path delay information generated in a given base station are supplied to the location processor 32 of the primary base station either directly as shown in FIG. 2A or indirectly via the message handler 34 and call processor 38 as shown in FIG. 2B.

Figure 4:
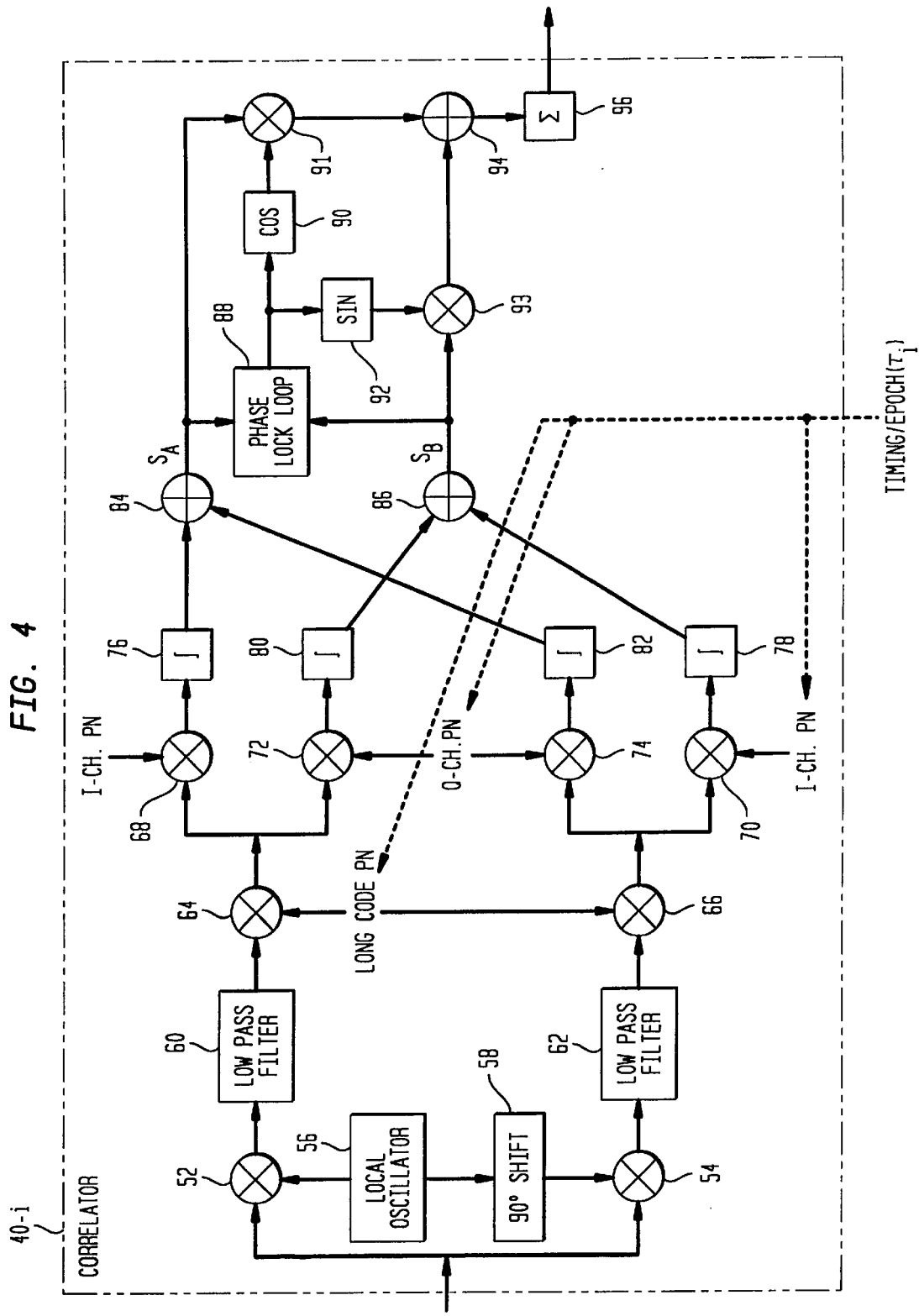
FIG. 4 shows an exemplary correlator suitable for use in the signal detector of FIG. 3.

FIG. 4 shows an exemplary correlator 40-$i$ suitable for use in the signal detector 30 of FIG. 3. The incoming location signal received from the particular mobile station is applied to mixers 52, 54 which are part of corresponding in-phase (I) and quadrature (Q) detection channels, respectively. The I-channel mixer 52 receives a local oscillator (LO) signal directly from an LO 56, while the Q-channel mixer 54 receives a 90° phase-shifted version of the LO signal from a phase shifter 58. The outputs of the mixers 52, 54 are filtered in respective low pass filters 60, 62 and applied to mixers 64, 66. The mixers 64, 66 multiply the user-specific pseudo-random noise (PN) long code with the received signal outputs of the respective filters 60, 62. The long code has a timing epoch selected in accordance with the path delay hypothesis $\tau_i$ of the correlator 40-$i$. On the hypothesis that the path delay between the mobile station and a given base station is $\tau_i$, the base station shifts its user-specific PN long code, as well as I-channel and Q-channel PN sequences used to obtain diversity in the system, by an appropriate amount relative to the system time. For example, the long PN code and the I-channel and Q-channel sequences may be shifted by an amount equal to about $2\tau_i$ for detecting round trip path delay relative to a system time corresponding to a zero path delay, and the incoming signal is then decoded/de-spread using the shifted sequences. A high output power after the de-spreading operation associated with the hypothesis $\tau_i$ indicates the existence of such a path delay component in the signal propagation path between the mobile and the base station.

The outputs of the mixers 64, 66 are applied to I-channel multipliers 68, 70 and Q-channel multipliers 72, 74 as shown. The I-channel multipliers 68, 70 multiply the output of respective mixers 64, 66 using the I-channel PN sequence, and the Q-channel multipliers multiply the output of respective mixers 64, 66 using the Q-channel PN sequence. As noted above, the I-channel and Q-channel PN sequences also have a timing epoch corresponding to the path delay hypothesis $\tau_i$ of the correlator 40-$i$. The outputs of multipliers 68, 70, 72 and 74 are integrated in corresponding integrators 76, 78, 80 and 82. The output of integrators 76 and 82 are summed in a summing device 84 to produce a signal $S_A$, and the outputs of integrators 80 and 78 are summed in a summing device 86 to produce a signal $S_B$. If the timing epoch associated with path delay $\tau_i$ of correlator 40-$i$ is correct, the signals $S_A$ and $S_B$ will be of the form:

$$S_A = x\cos\theta + \text{noise}$$

$$S_B = x\sin\theta + \text{noise}$$

where x is the desired signal amplitude and $\theta$ is an unknown phase rotation during the integration period of integrators 76, 78, 80 and 82. A phase lock loop 88 is used to estimate the phase rotation $\theta$. The phase rotation estimate from phase lock loop 88 is applied to circuit elements 90, 92 to generate respective cosine and sine values of the phase rotation estimate. These values are used in multipliers 91 and 93 to de-rotate the respective signals SA and SB such that an estimate of x is obtained at the output of a summing device 94. Exemplary phase lock loops suitable for use estimating the phase rotation $\theta$ in correlator 40-$i$ are described in greater detail in W. C. Lindsey, "Synchronization Systems in Communications," Prentice-Hall, 1972, Englewood Cliffs, N.J.

The correlator 40-$i$ further includes an accumulator 96 which is used to provide an effective extension of the integration period such that a higher signal-to-noise ratio can be achieved. Within a given correlator, the extended integration may be implemented as follows. If a net integration period T is needed based on the required signal-to-noise ratio and the relative power transmitted from the mobile station, the path delay estimation error is reduced by dividing T into a number N of mutually disjoint periods $T_1, T_2, \ldots T_N$ where $T_1 + T_2 + \ldots T_N = T$. It should be noted that a given integration period $T_i$ and the above-described de-rotate/estimation process should be configured such that the phase rotation within each integration period $T_i$ is approximately constant. Suitable integration periods $T_i$ for an exemplary system may be in the range of about 1 to 5 milliseconds, but may vary in accordance with application-specific factors such as vehicle speed.

The mobile station 12 of system 10 in accordance with present invention transmits a location signal which may include a known sequence having a desired power level such that a signal detector 30 in a primary base station and at least two other surrounding base stations can detect the signal and estimate the path delay using correlators 40-$i$ as previously described. A location processor 32 associated with the primary base station can then use the aggregate path delay information to estimate mobile location. A number of exemplary techniques for operating the mobile station and base stations of system 10 to provide the desired signal transmission and corresponding path delay measurements will be described in conjunction with the flow diagrams of FIGS. 5, 6 and 7.

FIG. 5 is a flow diagram of a mobile location estimation process in accordance with a first embodiment of the invention. This embodiment is particularly well-suited for use in estimating mobile location at the initiation of a call or a paging response. The above-cited IS-95 standard requires the mobile station to transmit a dial-up traffic preamble after it receives a traffic channel assignment message from a base station. This traffic preamble is a known sequence in the form of all zeros which is subsequently spread by the user-specific PN sequence. The mobile station continuously transmits the traffic preamble until it receives an appropriate response from the a base station or until the expiration of a maximum timeout period which is usually about two seconds. The primary base station intentionally delays the transmission of a response to the traffic preamble such that the mobile station transmits the preamble for a longer period of time that it would otherwise, in order to provide an extended integration period. A number of surrounding base stations can also detect the traffic preamble transmitted by the mobile station, and can use the above-noted extended integration period to obtain sufficient signal-to-noise ratio to generate the necessary path delay information. Since the traffic preamble is a known sequence, the probability of correct detection will be substantially higher than that of an unknown data-modulated sequence. Also, the fact that the traffic preamble is spread by the user-specific PN sequence helps the base stations to identify the correct mobile station signal from among those of other mobile stations.

The power level at which the traffic preamble is transmitted is determined in accordance with the invention as the transmit power level of the mobile station when it receives an access acknowledgment from the base station. In accordance with the above-cited IS-95 standard, the mobile station uses a nominal initial transmit power level for an access request signal to request services such as a call origination or page response. If the mobile station does not receive an acknowledgment of its access request within a particular time period, which may be specified by a base station in a broadcast message, the mobile station will re-send the request but at a higher power level offset from the previous power level. Like the initial transmit power level, the offset may be specified in a broadcast message from the base station. This process is repeated until the mobile station receives an acknowledgment of its access request, and helps the mobile station get its access request through to the base station at a proper power level. After acknowledging the access request, the base station transmits a channel assignment message to the mobile station. Upon receipt of the channel assignment message, the IS-95 standard requires the mobile station to transmit the traffic preamble at the same power level that it last transmitted before it received the access acknowledgment. Therefore, if the base station intentionally delays the transmission of the access acknowledgment to the mobile station, the subsequent transmit power level which the mobile station uses to send the dial-up traffic preamble will be higher than it would be otherwise. The present invention utilizes this technique to allow a primary base station to control the transmit power of the mobile station during mobile location estimation.

These aspects of the invention are illustrated in steps 100 to 110 of FIG. 5. Step 100 indicates that the mobile location estimation may be initiated for a call origination or a page response. In step 102, the mobile station sends out a conventional access request signal, indicating to nearby base stations that the mobile user is requesting access to the system, and waits for an acknowledgment. In step 104, once a given base station receives a valid access request signal from the mobile station, that base station becomes the primary base station. At least two other surrounding base stations will serve as secondary base stations in generating path delay information needed to estimate the mobile location. The location processor 32 associated with the primary base station, referred to as the primary location processor, notifies at least two other surrounding base stations to prepare for detection of a location signal in the form of a traffic preamble to be transmitted by the mobile station. If necessary, the primary base station will intentionally delay the transmission of an acknowledgment signal to the mobile station in order to force the mobile station to increase its subsequent transmit power level for the traffic preamble. The determination of whether to provide this intentional delay may be based on the mobile station signal power levels detected at the primary base station. If the intentional delay is provided, it may be on the order of one or two access request signals, where the delay between access request signals is specified in a broadcast message from the base station, in order to provide a net transmit power level increase of about 6 to 10 dB. After acknowledging the access request, the primary base station transmits a channel assignment message to the mobile station. Step 106 indicates that the mobile station responds to receipt of the channel assignment message by transmitting the traffic preamble and waiting for an acknowledgment from the primary base station.

In step 108, the surrounding base stations each perform the signal detection described in conjunction with FIGS. 3 and 4 above in order to estimate the relative path delay associated with the traffic preamble transmitted by the mobile station. The primary base station delays the transmission of its traffic preamble acknowledgment to the mobile station such that the surrounding base stations can have sufficient time to perform the necessary signal detection. For example, this intentional delay may be selected in the range from about 0.2 seconds to about 1.2 seconds in an exemplary embodiment. After the intentional delay, the primary base station sends a traffic preamble acknowledgment signal to the mobile station. The surrounding base stations then report the relative path delay information to the primary location processor 32 associated with the primary base station via one or more of the above-described MSCs. The primary location processor 32 uses the aggregate delay information from the primary and surrounding base stations to estimate the mobile station location. For example, the primary location processor may utilize a conventional triangularization technique with path data from three base stations which received the mobile station traffic preamble to determine the mobile location. Such techniques are well-understood in the art and will therefore not be described in detail herein. The primary location processor 32 then sends the mobile position estimate to the appropriate service agent or agents for further processing in accordance with the particular service. For example, the mobile position may be used to generate directions, map displays or other audio and/or video information which can be supplied to the mobile station in a suitable format. The traffic channel set up is then complete and a user conversation can take place over the traffic channel in a conventional manner, as indicated in step 110.

FIG. 6 is a flow diagram of a mobile location estimation process in accordance with a second embodiment of the invention. This embodiment is particularly well-suited for use in estimating mobile location during an on-going call in which user conversation data is carried over the traffic channel, and involves the use of a fake hard handoff during the on-going call. The primary base station directs the mobile station to transmit the traffic preamble at a desired power level using an the extended handoff direction message (EHDM) of the IS-95 CDMA system. The EHDM was designed to direct the mobile station to perform a hard handoff between sectors and/or frequencies of a given base station or between different base stations. The present invention utilizes the EHDM in a fake handoff, that is, a handoff to the same sector and frequency currently being used by the mobile, in order to direct the mobile station to send out the desired traffic preamble at the preferred power level such that surrounding bas stations are able to detect it. It should be noted that the EHDM of IS-95 permits a primary base station to specify the length of the traffic preamble, such that a longer integration time can be provided, as well as a power offset to the open loop power estimate. With the high speed reverse link power control of the IS-95 standard, the increased interference resulting from the higher transmitted power of the mobile stations can be reduced at a speed of 16 dB/frame, where a frame is 20 milliseconds in duration. It should be noted that in applications in which only a small percentage of users require the location services, individual mobile stations may be directed to transmit the traffic preamble for the base stations to detect. If a high percentage of users require the location services, synchronized locate commands may be utilized to minimize the frame error rate.

Step 120 of FIG. 6 indicates that an on-going call is in progress over the traffic channel when the mobile location process is initiated. The location process is initiated in step 122 by the expiration of the periodic timer 36 of the primary base station or the corresponding MSC, or the receipt of a command from a location service agent. The primary location processor 32 associated with the primary base station serving the on-going call then notifies the surrounding base stations to prepare for detection of the traffic preamble associated with the particular mobile station to be located. The primary base station sends out the EHDM to perform a fake hard handoff to the same base station, same traffic channel and same frequency currently being used for the on-going call. In the EHDM, the primary base station directs the mobile station to send out the traffic preamble with a desired power offset and preamble length. For example, the EHDM may specify a power offset of about 5 to 12 dB, and a preamble length of about 2 to 7 frames. Of course, other values could be used in alternative embodiments. In step 126, the mobile station transmits the traffic preamble as directed by the base station.

In step 128, the surrounding base stations perform the signal detection described in conjunction with FIGS. 3 and 4 above in order to estimate the relative path delay of the received traffic preamble. After the signal detection is completed, the primary base station sends a power down command to the mobile station in order to minimize interference, and then sends an acknowledgment to the mobile station to complete the handoff process. The surrounding base stations report the relative path delay information to the primary location processor 32 associated with the primary base station, and the primary location processor utilizes triangularization or another suitable technique to estimate the mobile location from the aggregate delay information. The primary location processor then sends the mobile station location estimate to the appropriate location service agent or agents. The user conversation of the on-going call can then continue in the traffic channel, as shown in step 130.

FIG. 7 is a flow diagram of a mobile location estimation process in accordance with a third embodiment of the invention. The above-described use of the EHDM to direct the mobile station to transmit the traffic preamble has a number of disadvantages in certain applications. For example, the transmit power level for the preamble is indirectly specified and therefore may not be sufficiently accurate. In addition, the maximum power down speed after detection of the preamble in the necessary base stations is about 16 dB/frame, which might cause some amount of additional interference in the system. The third embodiment illustrated in FIG. 7 overcomes these disadvantages of the second embodiment by creating a new message in IS-95 or other similar standard in order to allow the base station to direct the mobile station to transmit a preamble or other known sequence at the desired starting epoch, with the desired length and at the desired power level. The desired power level may be specified as a power level offset to be added to a closed loop power control result. This new message allows surrounding base stations to detect the mobile signal and generate the path delay information required to estimate mobile location. A significant advantage of employing this new location message is that the message does not involve the reverse link power control, and can direct the mobile station to return to an original power level immediately after transmitting the preamble at a higher power level. This provides a more effective reduction of the increased interference penalty associated with the higher transmit power level of the traffic preamble.

Step 140 of FIG. 7 indicates that an on-going call is in progress over the traffic channel before the mobile location process is initiated. The location process is initiated in step 142 by the expiration of the periodic timer 36 of the primary base station or the corresponding MSC, or the receipt of a command from a location service agent. The primary location processor 32 associated with the primary base station serving the on-going call then notifies the surrounding base stations to prepare for detection of the traffic preamble associated with the particular mobile station to be located. The primary base station sends out a location probe message (LPM) to direct the mobile station to send out a traffic preamble at a desired power level and desired preamble length. The power levels and preamble length may be the same as those used for the FIG. 6 process in a given application. In step 126, the mobile station receives the LPM from the primary base station and responds by transmitting the traffic preamble using the power level and preamble length specified in the LPM. Immediately after sending out the traffic preamble, the mobile station returns to the conversation mode and reduces the transmit power to the level used before sending the preamble.

In step 148, the surrounding base stations perform the signal detection described in conjunction with FIGS. 3 and 4 above in order to estimate the relative path delay of the received traffic preamble. After the signal detection is completed, the surrounding base stations report the relative path delay information to the primary location processor 32 associated with the primary base station, and the primary location processor utilizes triangularization or another suitable technique to estimate the mobile location from the aggregate delay information. The primary location processor then sends the mobile station location estimate to the appropriate location service agent or agents. The user conversation of the on-going call can then continue in the traffic channel, as shown in step 150.

The present invention may utilize a number of different techniques for activating the above-described mobile location services. One technique involves checking the number that the mobile user is dialing, and activating the location service automatically if the dialed number is in a group of predetermined numbers for which the location service is provided. For example, the location service may be activated automatically each time a user dials an emergency number such as 911 or a roadside assistance number. This type of activation could be provided using message handler 34 of a given base station to provide an activation indication to a corresponding location processor 32. Also, the activation of the location service may involve checking user data in the HLR 20 and VLR 22 of the system memory 18 of FIG. 1 to determine if a given user requires or is entitled to grade of service which includes the mobile location estimation. In other embodiments, the system may check with a party in the communication link other than the mobile user to determine if that party has requested mobile location service. The other party may be, for example, a governmental authority such as the FBI, or a private business entity owning a number of mobile stations used by its employees. Such activation can also be performed using the HLR 20 and VLR 22 of the system memory 18.

The above-described embodiments of the invention are intended to be illustrative only. Numerous alternative embodiments may be devised by those skilled in the art without departing from the scope of the following claims.

What is claimed is:

1. A method of estimating mobile station location in a wireless communication system in which a mobile station communicates with a primary base station associated with a primary location processor, the method comprising the steps of:

transmitting from the primary base station a message signal directing the mobile station to transmit a location signal, wherein the message signal comprises a channel assignment message generated in the primary base station in response to receipt of an access request signal from the mobile station;

the primary base station operating so as to increase a transmit power level of the location signal as necessary to facilitate detection of the location signal in the primary base station by intentionally delaying transmission of a first acknowledgment signal to the mobile station in response to receipt of the access request signal from the mobile station, such that the mobile station thereby increases a transmit power level of the location signal;

detecting the location signal in the primary base station to generate a first path delay measurement;

the primary base station intentionally delaying transmission of a second acknowledgment signal to the mobile station in response to receipt of the location signal, such that the mobile station continues to transmit the location signal for a period of time sufficient to permit a plurality of secondary base stations to detect the location signal;

receiving additional path delay measurements generated based on detection of the location signal in the plurality of secondary base stations; and utilizing the first and additional delay measurements to estimate the location of the mobile station.

2. An apparatus for estimating mobile station location in a wireless communication system, the apparatus comprising:

a primary base station for communicating with the mobile station, the primary base station transmitting a message signal directing the mobile station to transmit a location signal, the primary base station detecting the location signal to generate a first path delay measurement, wherein the message signal comprises a channel assignment message generated in the primary base station in response to receipt of an access request signal from the mobile station;

the primary base station operating so as to increase a transmit power level of the location signal as necessary to facilitate detection of the location signal in the primary base station by intentionally delaying transmission of a first acknowledgment signal to the mobile station in response to receipt of the access request signal from the mobile station, such that the mobile station thereby increases a transmit power level of the location signal; and a primary location processor associated with the primary base station, the primary location processor receiving the first path delay measurement, receiving additional path delay measurements generated by a plurality of secondary base stations which have detected the location signal, and utilizing the first and additional delay measurements to estimate the location of the mobile station;

wherein the primary base station intentionally delays transmission of a second acknowledgment signal to the mobile station in response to receipt of the location signal in the primary base station, such that the mobile station continues to transmit the location signal for a period of time sufficient to permit the plurality of secondary base stations to detect the location signal.

3. An apparatus for estimating mobile station location in a wireless communication system, the apparatus comprising:

a mobile station operative to receive a message signal from a primary base station of the system, wherein the message signal comprises a channel assignment message generated in the primary base station in response to receipt of an access request signal from the mobile station;

wherein the location signal is detected in the primary base station and a plurality of secondary base stations in order to generate path delay measurements which can be processed to estimate the location of the mobile station;

the primary base station operating so as to increase a transmit power level of the location signal as necessary to facilitate detection of the location signal in the primary base station by intentionally delaying transmission of a first acknowledgment signal to the mobile station in response to receipt of the access request signal from the mobile station, such that the mobile station thereby increases a transmit power level of the location signal; and wherein the primary base station intentionally delays transmission of a second acknowledgment signal to the mobile station in response to receipt of the location signal in the primary base station, such that the mobile station continues to transmit the location signal for a period of time sufficient to permit the plurality of secondary base stations to detect the location signal.

* * * * *